(12) United States Patent
Jiang et al.

(10) Patent No.: US 10,394,599 B2
(45) Date of Patent: Aug. 27, 2019

(54) BREAKING DEPENDENCE OF DISTRIBUTED SERVICE CONTAINERS

(71) Applicant: International Business Machines Corporation, Armonk, NY (US)

(72) Inventors: Xuan Jiang, Beijing (CN); Xin Peng Liu, Beijing (CN); Bing Dong Ma, Beijing (CN); Hong Mei Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 92 days.

(21) Appl. No.: 15/398,805

(22) Filed: Jan. 5, 2017

(65) Prior Publication Data
US 2018/0189114 A1    Jul. 5, 2018

(51) Int. Cl.
  *G06F 9/46*   (2006.01)
  *G06F 9/48*   (2006.01)
(52) U.S. Cl.
  CPC .................. *G06F 9/4843* (2013.01)
(58) Field of Classification Search
  CPC ....................................................... G06F 9/52
  USPC ........................................................ 718/106
  See application file for complete search history.

(56) References Cited

U.S. PATENT DOCUMENTS

| | | | |
|---|---|---|---|
| 6,446,134 B1 * | 9/2002 | Nakamura | G06F 11/0709 709/224 |
| 6,581,088 B1 * | 6/2003 | Jacobs | G06F 9/465 709/203 |
| 7,434,087 B1 * | 10/2008 | Singh | G06F 11/1443 714/4.11 |
| 7,634,651 B1 * | 12/2009 | Gerde | H04L 63/0428 713/153 |
| 7,757,236 B1 * | 7/2010 | Singh | G06F 9/5083 709/224 |

(Continued)

FOREIGN PATENT DOCUMENTS

WO    WO2014176104 A1    10/2014

OTHER PUBLICATIONS

Bagchi et al., "Dependency Analysis in Distributed Systems using Fault Injection: Application to Problem Determination in an e-commerce Environment," 12th International Workshop on Distributed Systems: Operations & Management, Oct. 2001, 13 pages.

(Continued)

*Primary Examiner* — Mehran Kamran
(74) *Attorney, Agent, or Firm* — Yee & Associates, P.C.; Jay Wahlquist

(57) ABSTRACT

Managing service container dependency is provided. A notification that a first service container is running on a host environment is received. It is determined whether the first service container is dependent on a second service container being up and running on the host environment. In response to determining that the first service container is dependent on a second service container being up and running on the host environment, it is determined whether the second service container is running on the host environment. In response to determining that the second service container is not running on the host environment, service requests from the first service container to the second service container are responded to using stub data that corresponds to the second service container.

18 Claims, 10 Drawing Sheets

(56) References Cited

U.S. PATENT DOCUMENTS

| | | | | |
|---|---|---|---|---|
| 7,900,200 | B1* | 3/2011 | Violleau | G06F 9/4493 717/167 |
| 8,601,101 | B1* | 12/2013 | Singh | H04L 69/40 370/254 |
| 9,256,467 | B1* | 2/2016 | Singh | G06F 9/5055 |
| 2002/0046228 | A1* | 4/2002 | Scheifler | G06F 9/465 718/1 |
| 2003/0204647 | A1* | 10/2003 | Jacobs | G06F 9/465 719/330 |
| 2008/0115116 | A1* | 5/2008 | Francis | G06F 11/3696 717/135 |
| 2009/0077236 | A1* | 3/2009 | Henry | B23B 3/162 709/226 |
| 2009/0086620 | A1* | 4/2009 | Fowler | H04L 12/40169 370/216 |
| 2010/0002707 | A1* | 1/2010 | Chang | H04L 45/02 370/395.31 |
| 2013/0254521 | A1* | 9/2013 | Bealkowski | G06F 9/445 713/2 |
| 2013/0268601 | A1* | 10/2013 | Reilly | G05B 23/0267 709/206 |
| 2014/0317261 | A1* | 10/2014 | Shatzkamer | G06F 9/455 709/223 |
| 2016/0006650 | A1* | 1/2016 | Song | H04L 12/6418 370/329 |
| 2016/0092324 | A1* | 3/2016 | Young | G06F 11/2033 714/4.11 |
| 2016/0094627 | A1* | 3/2016 | Subramanyam | H04L 67/10 709/203 |
| 2016/0162320 | A1* | 6/2016 | Singh | G06F 9/5055 718/1 |
| 2016/0205213 | A1* | 7/2016 | Kolam | H04L 67/32 709/218 |
| 2016/0269237 | A1* | 9/2016 | Higgins | H04L 63/10 |
| 2017/0034015 | A1* | 2/2017 | Li | G06F 8/61 |
| 2017/0061531 | A1* | 3/2017 | Smith | G06Q 40/02 |
| 2017/0118066 | A1* | 4/2017 | Mathew | H04L 41/0663 |
| 2018/0052723 | A1* | 2/2018 | Yim | G06F 9/548 |
| 2018/0054358 | A1* | 2/2018 | Castagna | H04L 41/0816 |

OTHER PUBLICATIONS

Keller et al., "Determining Service Dependencies in Distributed Systems," Proceedings of the IEEE International Conference on Communications (ICC), Jun. 2001, 5 pages.

Mell et al., "The NIST Definition of Cloud Computing," National Institute of Standards and Technology Special Publication 800-145, Sep. 2011, 7 pages.

* cited by examiner

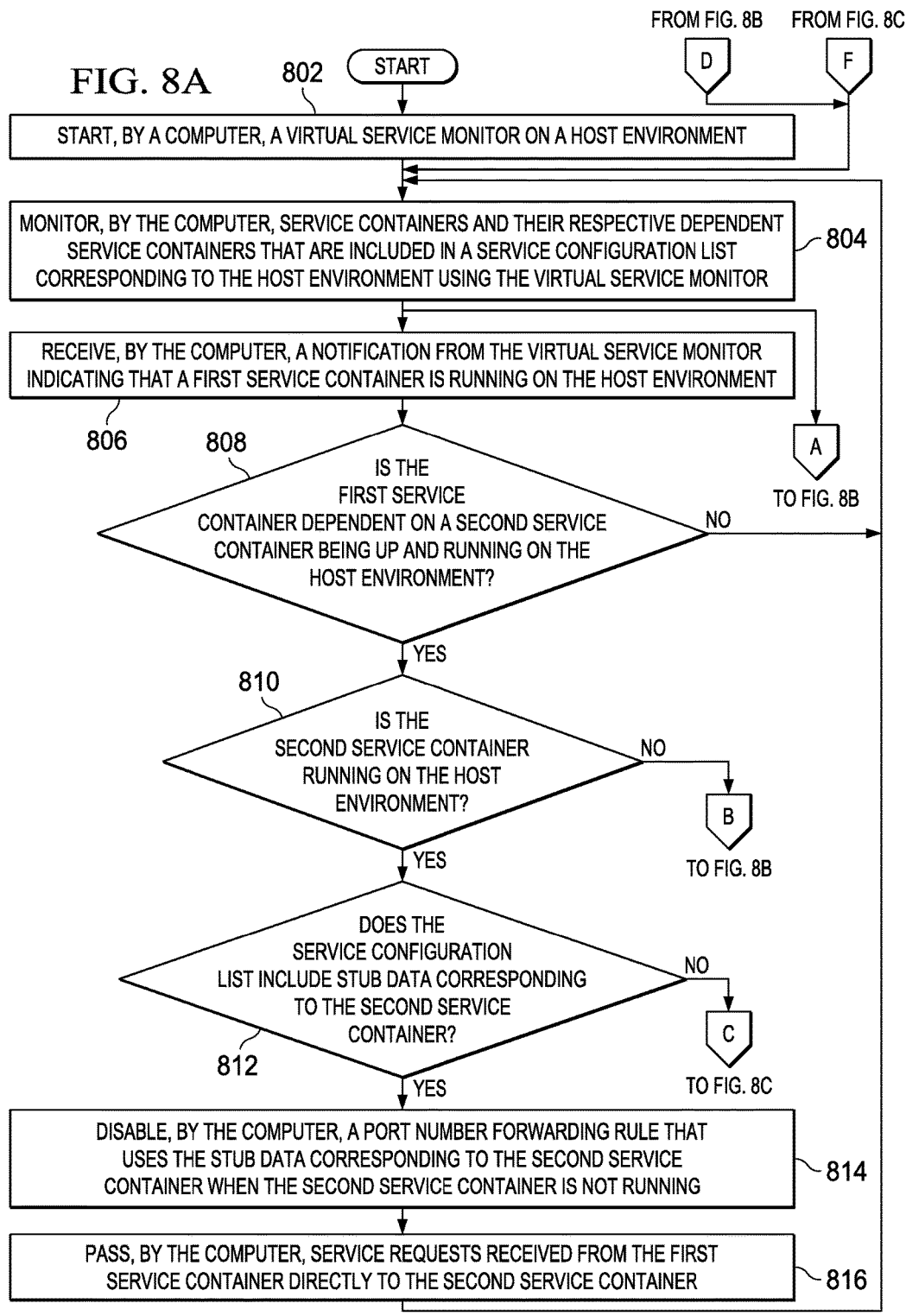

BREAKING DEPENDENCE OF DISTRIBUTED SERVICE CONTAINERS

BACKGROUND

1. Field

The disclosure relates generally to service containers distributed in a host environment and more specifically to breaking dependence between service containers distributed in the host environment during an initialization phase using stub data running on a service container dependency manager of the host environment.

2. Description of the Related Art

Cloud computing technology is widely used in many domains, especially for distributed application deployment. Typically, application and dependent services are running on different service containers on a cloud environment, called a distributed system. The dependency between the different service containers of a distributed system is becoming increasingly important for complex application deployments. Currently no solution exists to solve the dependency between service consumer containers and service provider containers during an initialization phase within a distributed system. For example, today a service consumer container will fail or keep waiting when a service provider container, which the service consumer container is dependent upon to function properly, is not up and running.

SUMMARY

According to one illustrative embodiment, a computer-implemented method for managing service container dependency is provided. A computer receives a notification that a first service container is running on a host environment. The computer determines whether the first service container is dependent on a second service container being up and running on the host environment. In response to the computer determining that the first service container is dependent on a second service container being up and running on the host environment, the computer determines whether the second service container is running on the host environment. In response to the computer determining that the second service container is not running on the host environment, the computer responds to service requests from the first service container to the second service container using stub data running on the computer that corresponds to the second service container. According to other illustrative embodiments, a computer system and computer program product for managing service container dependency are provided.

BRIEF DESCRIPTION OF THE DRAWINGS

FIGS. 8A-8C are a flowchart illustrating a process for managing service container dependency in accordance with an illustrative embodiment.

DETAILED DESCRIPTION

Figure 1:
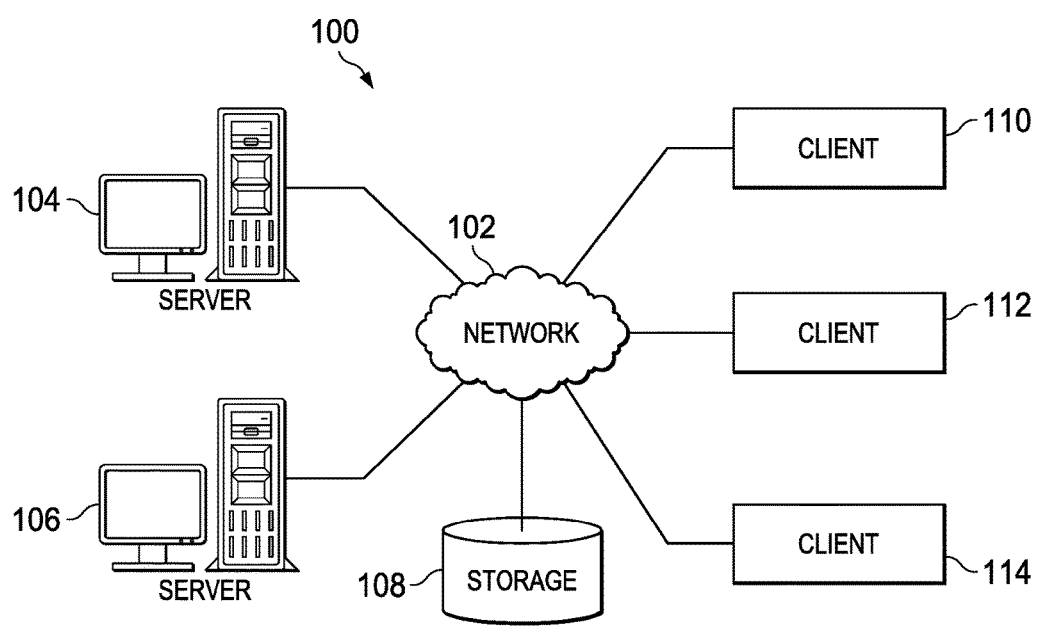
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-5, diagrams of data processing environments are provided in which illustrative embodiments may be implemented. It should be appreciated that FIGS. 1-5 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide a set of service container dependency management services for breaking dependencies between service containers during an initialization phase of relied upon service containers using stub data running on server 104 and server 106. Also, it should be noted that server 104 and server 106 may each represent a plurality of servers providing service container dependency management services for a plurality of service container host environments. A service container is an isolated environment that runs an application, which provides a service to requesting service consumers. A host environment may run many service containers simultaneously. Each service container is built from an image. The image is a read-only template with instructions for creating a service container. Thus, the image defines the content of a service container, which process to run when the service container is booted, and a variety of other configuration details.

Client 110, client 112, and client 114 also connect to network 102. Clients 110, 112, and 114 are clients of server 104 and server 106. Server 104 and server 106 may provide information, such as boot files, operating system images, and software applications to clients 110, 112, and 114. In this example, clients 110, 112, and 114 each represent an environment that hosts a plurality of service containers. A service container host environment may be, for example, a cloud environment, a data center environment, a rack of servers environment, or a single server environment.

Storage 108 is a network storage device capable of storing any type of data in a structured format or an unstructured format. In addition, storage 108 may represent a plurality of network storage devices. Further, storage 108 may store service configuration lists, service container dependency flow data, service container stub data, service container images, and the like. Furthermore, storage unit 108 may store other types of data, such as authentication or credential data that may include user names, passwords, and biometric data associated with system administrators, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), and a wide area network (WAN). FIG. 1 is intended as an example only, and not as an architectural limitation for the different illustrative embodiments.

Figure 2:
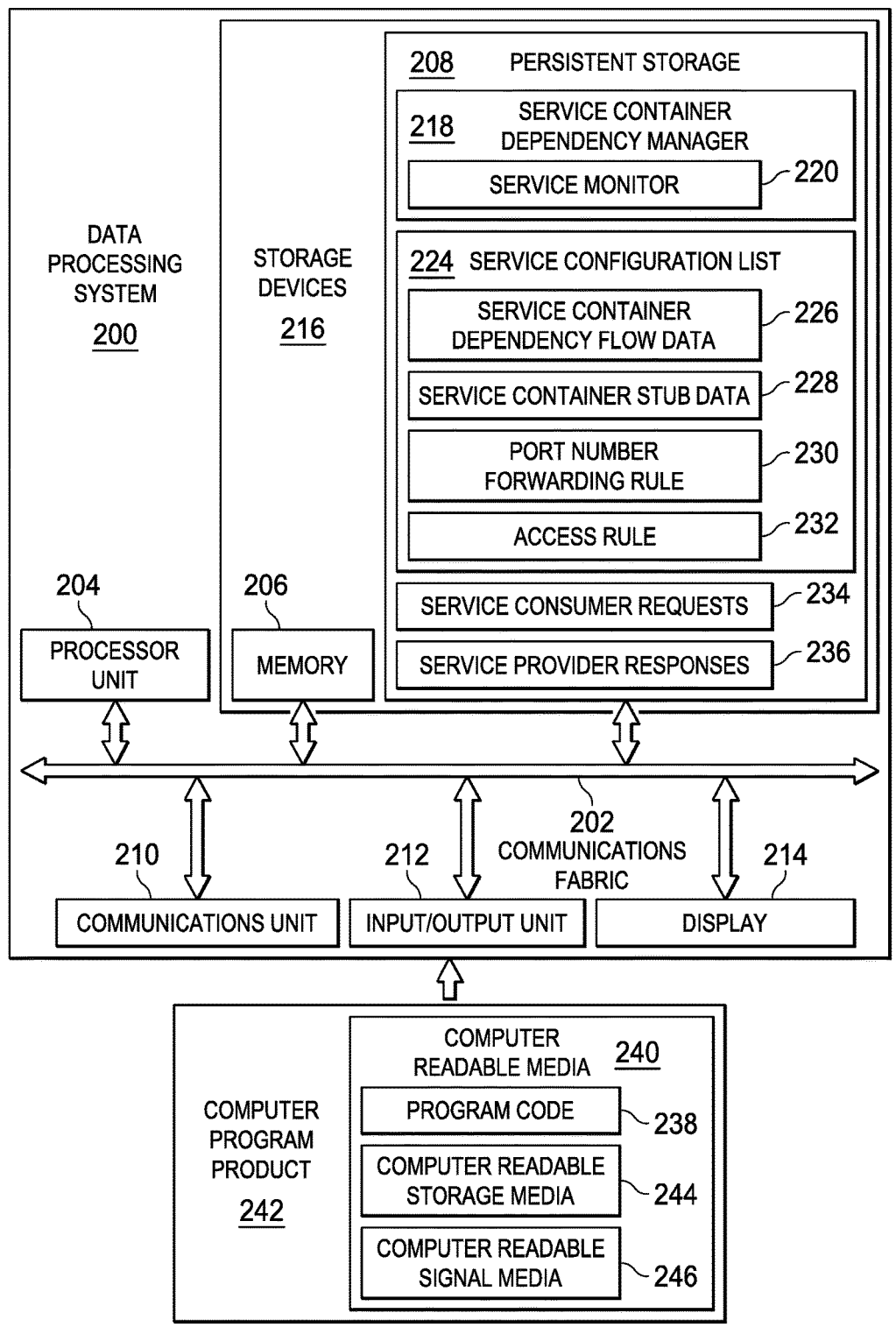
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores service container dependency manager 218. However, it should be noted that even though service container dependency manager 218 is illustrated as residing in persistent storage 208, in an alternative illustrative embodiment service container dependency manager 218 may be a separate component of data processing system 200. For example, service container dependency manager 218 may be a hardware component coupled to communication fabric 202 or a combination of hardware and software components.

Service container dependency manager 218 may run continually on data processing system 200 as a daemon, for example. Service container dependency manager 218 controls the process of breaking dependence between service containers. As an example, a Web application is deployed on an application server running on one service container (e.g., container B) and the Web application depends on a database deployed on a database server running on another service container (e.g., container A). In most of cases, the Web application will not start successfully or will fail unless the database running on the other service container (container A) is ready to process service requests before the Web application is started. Typically, this type of service container dependency is not a problem for legacy system environments as traditional distributed systems are not required to start and restart very frequently. However, in a cloud environment, the operation of creating and removing service containers is used more often, especially for multiple cloud users. Consequently, the dependency between service containers and the time consumed while waiting for dependent service containers to be up and running is considerable in a cloud computing environment.

Using the example above, service container dependency manager 218 provides the requirements of both service containers A and B. By utilizing service container dependency manager 218, a user of data processing system 200 may start these two service containers A and B (or more if needed) at the same time even though service container B is requiring the service provided by container A. First, service container B connects to service container dependency manager 218, then service container dependency manager 218 responds to service container B based on a set of rules. The set of rules may include, for example: 1) if service container dependency manager 218 determines that the service on container A is running and ready to process service requests, then service container dependency manager 218 forwards all service requests from service container B directly to service container A; 2) if service container dependency manager 218 determines that service container A is not started, then service container dependency manager 218 starts service container A and responds to service requests from service container B using stub data corresponding to service container A running on service container dependency manager 218; 3) if service container dependency manager 218 determines that the service on container A is not started, then service container dependency manager 218 starts the service on container A and responds to service requests from service container B using stub data corresponding to service container A running on service container dependency manager 218; and 4) if service container dependency manager 218 determines that service container A has failed, then service container dependency manager 218 takes over the service provided by container A using stub data corresponding to service container A running on service container dependency manager 218 and restarts service container A.

In other words, with service container dependency manager 218 running on data processing system 200, a user can start all related service containers at the same time, no matter what the relied upon service containers or whether the services on those relied upon service containers are started or not. Service container dependency manager 218 handles all the service requests from service consumers and responds to the service requests until the service on the relied upon container is ready to process the service requests. As a result, service container dependency manager 218 may decrease the time needed to deploy multiple service containers having service container dependencies.

As a further example, assume that both container A and container B and their respective services are running correctly. However, service container dependency manager 218 determines that container A needs to be shutdown or that the service on container A needs to be restarted for maintenance. In this situation, service container dependency manager 218 may take over the service provided by container A to implement zero shutdown time from the server side.

In this example, service container dependency manager 218 includes service monitor 220. Service container dependency manager 218 utilizes service monitor 220 to monitor registered service containers within the host environment. Service monitor 220 utilizes information within service configuration list 224 to determine which service containers to monitor. Service configuration list 224 lists all registered service containers within the host environment, along with their respective configurations and any corresponding service container dependencies.

Also in this example, service configuration list 224 includes service container dependency flow data 226, service container stub data 228, port number forwarding rule 230, and access rule 232. Service monitor 220 monitors and records service container dependency flow data 226. Service container dependency flow data 226 represent information regarding the flow of data between dependent service containers within the host environment.

Service container stub data 228 represent information corresponding to service containers that are relied upon by dependent service containers in order for the dependent service containers to perform their respective services. Service container stub data 228 may include, for example, an image, an image identifier, a port number identifier, service requests, and responses to the service requests corresponding to different service containers. Service container dependency manager 218 may utilize service container stub data 228 to take over and execute a service performed by a particular service container in response to that particular service container not being available to another service container that relies on a service provided by the unavailable service container.

Port number forwarding rule 230 is a rule that directs service container dependency manager 218 to use service container stub data 228 when a service container, which a running service container is dependent upon, is not running. Access rule 232 is a rule that directs service container dependency manager 218 to allow direct access between a service container and its dependent service container when the service container is running and ready to process service request from the dependent service container.

Service monitor 220 also monitors and records service consumer requests 234 and service provider responses 236. Service consumer requests 234 represent service requests made by dependent service containers to other service containers that the dependent service containers rely upon to function. Service provider responses 236 represent responses to service requests provided by service containers to dependent service containers. Service monitor 220 stores service consumer requests 234 and service provider responses 236 in service container stub data 228.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 238 is located in a functional form on computer readable media 240 that is selectively removable and may be loaded onto or transferred to data processing system 200 for running by processor unit 204. Program code 238 and computer readable media 240 form computer program product 242. In one example, computer readable media 240 may be computer readable storage media 244 or computer readable signal media 246. Computer readable storage media 244 may include, for example, an optical or magnetic disc that is inserted or placed into a drive or other device that is part of persistent storage 208 for transfer onto a storage device, such as a hard drive, that is part of persistent storage 208. Computer readable storage media 244 also may take the form of a persistent storage, such as a hard drive, a thumb drive, or a flash memory that is connected to data processing system 200. In some instances, computer readable storage media 244 may not be removable from data processing system 200.

Alternatively, program code 238 may be transferred to data processing system 200 using computer readable signal media 246. Computer readable signal media 246 may be, for example, a propagated data signal containing program code 238. For example, computer readable signal media 246 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 238 may be downloaded over a network to persistent storage 208 from another device or data processing system through computer readable signal media 246 for use within data processing system 200. For instance, program code stored in a computer readable storage media in a data processing system may be downloaded over a network from the data processing system to data processing system 200. The data processing system providing program code 238 may be a server computer, a client computer, or some other device capable of storing and transmitting program code 238.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 244 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

It is understood that although this disclosure includes a detailed description on cloud computing, implementation of the teachings recited herein are not limited to a cloud computing environment. Rather, illustrative embodiments are capable of being implemented in conjunction with any other type of computing environment now known or later developed. Cloud computing is a model of service delivery for enabling convenient, on-demand network access to a shared pool of configurable computing resources, such as, for example, networks, network bandwidth, servers, processing, memory, storage, applications, virtual machines, and services, which can be rapidly provisioned and released with minimal management effort or interaction with a provider of the service. This cloud model may include at least five characteristics, at least three service models, and at least four deployment models.

The characteristics may include, for example, on-demand self-service, broad network access, resource pooling, rapid elasticity, and measured service. On-demand self-service allows a cloud consumer to unilaterally provision computing capabilities, such as server time and network storage, as needed automatically without requiring human interaction with the service's provider. Broad network access provides for capabilities that are available over a network and accessed through standard mechanisms that promote use by heterogeneous thin or thick client platforms, such as, for example, mobile phones, laptops, and personal digital assistants. Resource pooling allows the provider's computing resources to be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction, such as, for example, country, state, or data center. Rapid elasticity provides for capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. Measured service allows cloud systems to automatically control and optimize resource use by leveraging a metering capability at some level of abstraction appropriate to the type of service, such as, for example, storage, processing, bandwidth, and active user accounts. Resource usage can be monitored, controlled, and reported providing transparency for both the provider and consumer of the utilized service.

Service models may include, for example, Software as a Service (SaaS), Platform as a Service (PaaS), and Infrastructure as a Service (IaaS). Software as a Service is the capability provided to the consumer to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service is the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service is the capability provided to the consumer to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components, such as, for example, host firewalls.

Deployment models may include, for example, a private cloud, community cloud, public cloud, and hybrid cloud. A private cloud is a cloud infrastructure operated solely for an organization. The private cloud may be managed by the organization or a third party and may exist on-premises or off-premises. A community cloud is a cloud infrastructure shared by several organizations and supports a specific community that has shared concerns, such as, for example, mission, security requirements, policy, and compliance considerations. The community cloud may be managed by the organizations or a third party and may exist on-premises or off-premises. A public cloud is a cloud infrastructure made available to the general public or a large industry group and is owned by an organization selling cloud services. A hybrid cloud is a cloud infrastructure composed of two or more clouds, such as, for example, private, community, and public clouds, which remain as unique entities, but are bound together by standardized or proprietary technology that enables data and application portability, such as, for example, cloud bursting for load-balancing between clouds.

A cloud computing environment is service oriented with a focus on statelessness, low coupling, modularity, and semantic interoperability. At the heart of cloud computing is an infrastructure comprising a network of interconnected nodes.

Figure 3:
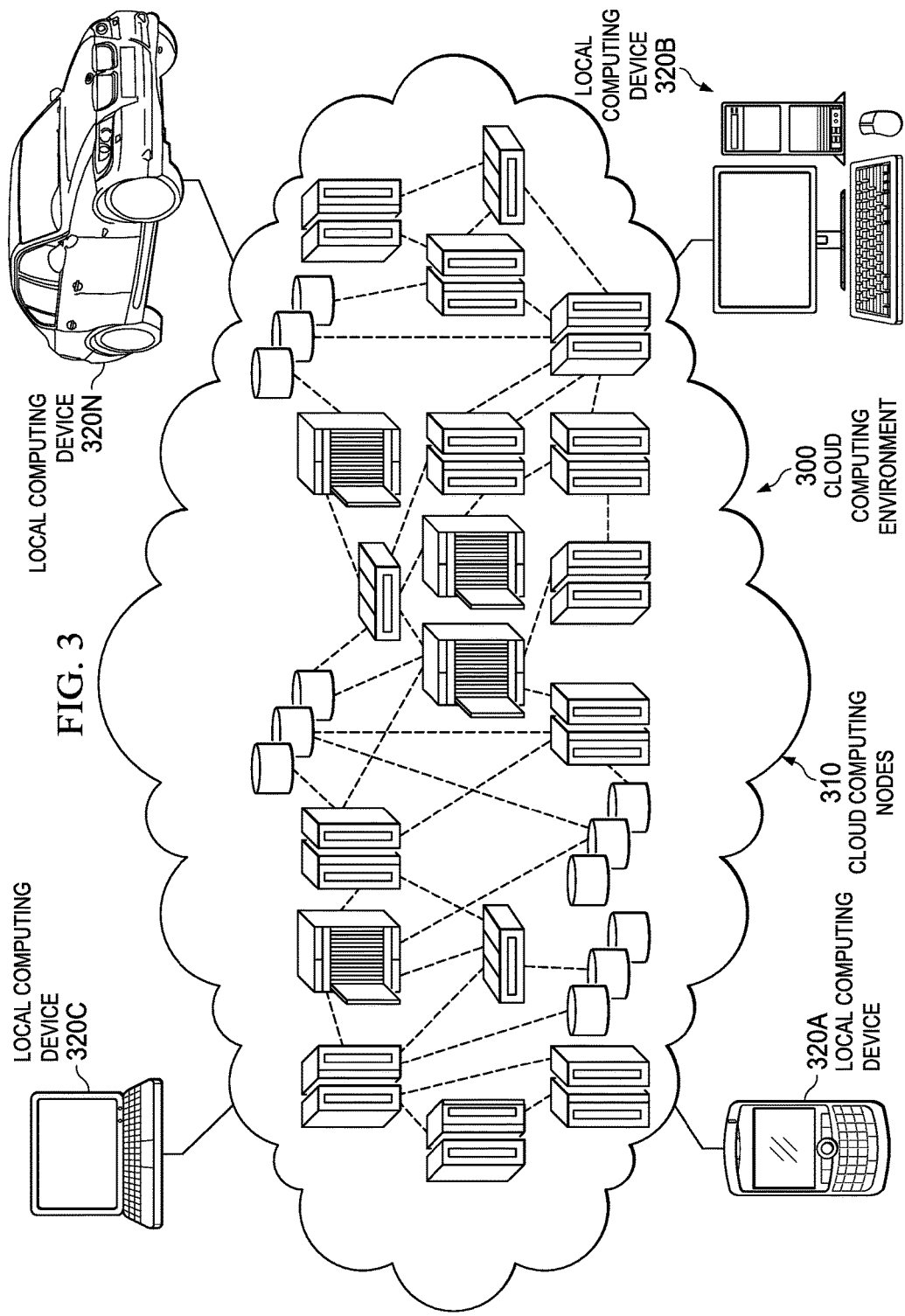
FIG. 3 is a diagram illustrating a cloud computing environment in which illustrative embodiments may be implemented.

With reference now to FIG. 3, a diagram illustrating a cloud computing environment is depicted in which illustrative embodiments may be implemented. In this illustrative example, cloud computing environment 300 includes a set of one or more cloud computing nodes 310 with which local computing devices used by cloud consumers, such as, for example, personal digital assistant or a smart phone 320A, desktop computer 320B, laptop computer 320C, and/or automobile computer system 320N, may communicate. Cloud computing nodes 310 may be, for example, server 104 and server 106 in FIG. 1. Local computing devices 320A-320N may be, for example, clients 110-114 in FIG. 1.

Cloud computing nodes 310 may communicate with one another and may be grouped physically or virtually into one or more networks, such as private, community, public, or hybrid clouds as described hereinabove, or a combination thereof. This allows cloud computing environment 300 to offer infrastructure, platforms, and/or software as services for which a cloud consumer does not need to maintain resources on a local computing device, such as local computing devices 320A-320N. It is understood that the types of local computing devices 320A-320N are intended to be illustrative only and that cloud computing nodes 310 and cloud computing environment 300 can communicate with any type of computerized device over any type of network and/or network addressable connection using a web browser, for example.

Figure 4:
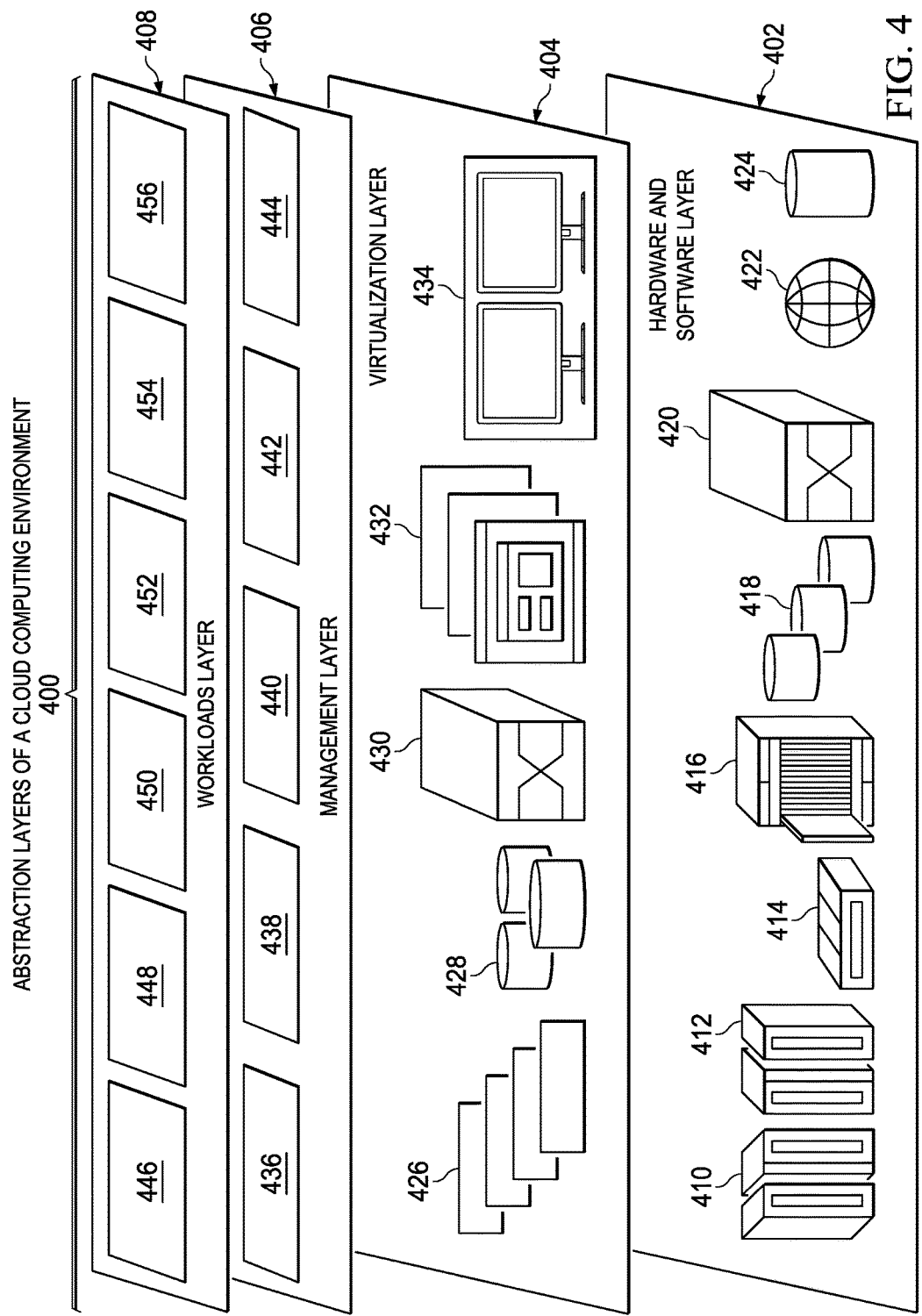
FIG. 4 is a diagram illustrating an example of abstraction layers of a cloud computing environment in accordance with an illustrative embodiment.

With reference now to FIG. 4, a diagram illustrating abstraction model layers is depicted in accordance with an illustrative embodiment. The set of functional abstraction layers shown in this illustrative example may be provided by a cloud computing environment, such as cloud computing environment 300 in FIG. 3. It should be understood in advance that the components, layers, and functions shown in FIG. 4 are intended to be illustrative only and embodiments of the invention are not limited thereto. As depicted, the following layers and corresponding functions are provided.

Abstraction layers of a cloud computing environment 400 includes hardware and software layer 402, virtualization layer 404, management layer 406, and workloads layer 408. Hardware and software layer 402 includes the hardware and software components of the cloud computing environment. The hardware components may include, for example, mainframes 410, RISC (Reduced Instruction Set Computer) architecture-based servers 412, servers 414, blade servers 416, storage devices 418, and networks and networking components 420. In some illustrative embodiments, software components may include, for example, network application server software 422 and database software 424.

Virtualization layer 404 provides an abstraction layer from which the following examples of virtual entities may be provided: virtual servers 426; virtual storage 428; virtual networks 430, including virtual private networks; virtual applications and operating systems 432; and virtual clients 434.

In one example, management layer 406 may provide the functions described below. Resource provisioning 436 provides dynamic procurement of computing resources and other resources, which are utilized to perform tasks within the cloud computing environment. Metering and pricing 438 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 440 provides access to the cloud computing environment for consumers and system administrators. Service level management 442 provides cloud computing resource allocation and management such that required service levels are met. Service level agreement (SLA) planning and fulfillment 444 provides pre-arrangement for, and procurement of, cloud computing resources for which a future requirement is anticipated in accordance with an SLA.

Workloads layer 408 provides examples of functionality for which the cloud computing environment may be utilized. Example workloads and functions, which may be provided by workload layer 408, may include mapping and navigation 446, software development and lifecycle management 448, virtual classroom education delivery 450, data analytics processing 452, transaction processing 454, and breaking dependence between service containers processing 456.

Illustrative embodiments provide a virtual service with a recorded stub of a service provider container running on a cloud environment to resolve dependency between a service consumer container and the service provider container. As a result, the service consumer container does not need to care about the service provider container's state. The virtual service, which has the recorded stub of the service provider container running on it, manages all service consumer requests and service provider responses. Therefore, the virtual service decreases the service initialization time and increases system performance.

A service monitor runs on the virtual service to monitor the network traffic across the service containers. The service monitor records the network traffic data and saves service request/response data in a stub of the service provider container. In addition, the service monitor maintains a service configuration list that includes source/target service container information, which is associated with the stub. Consequently, the virtual service automatically sets up service container dependency flow monitoring and recording across service containers.

If information in the service configuration list matches information corresponding to a service consumer request to a service provider container, which is currently offline, then the virtual service responds to the service consumer request using the stub corresponding to the service provider's container. Thus, the virtual service leverages the stored stub of the service provider container to break the dependence between the service consumer container and the service provider container during initialization or start up of the service provider container. On the other hand, if the service provider container is up and running, then the virtual service forwards the service consumer request directly to the service provider container for processing.

Therefore, illustrative embodiments utilize service virtualization to decouple service container dependencies while service containers are starting or restarting. Illustrative embodiments may generate multiple virtual services running on existing networks instead of generating a virtual network. The virtualization of illustrative embodiments virtualizes Transmission Control Protocol/Hypertext Transfer Protocol (TCP/HTTP) communications across service containers, rather than the network, itself.

Thus, illustrative embodiments may decrease service container deployment/start time, especially in a complex host environment. In addition, illustrative embodiments may provide zero down time for responding to service requests in some circumstances. Further, illustrative embodiments may not require additional changes to either the requesting application side or the service provider side.

Figure 5:
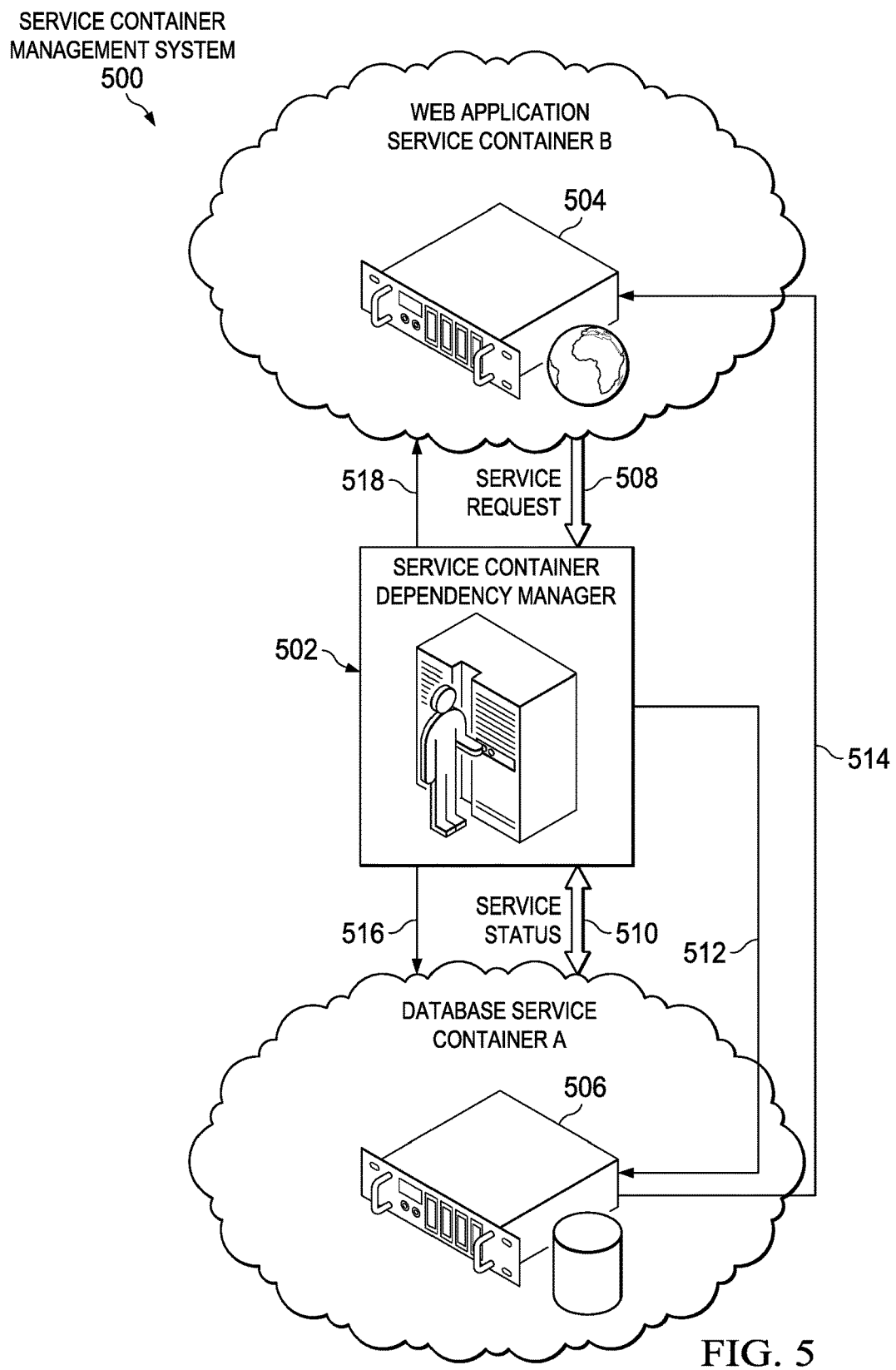
FIG. 5 is a diagram illustrating an example of a service container management system in accordance with an illustrative embodiment.

With reference now to FIG. 5, a diagram illustrating an example of a service container management system is depicted in accordance with an illustrative embodiment. Service container management system 500 may be implemented in a network of data processing systems, such as network data processing system 100 in FIG. 1, or a cloud computing environment, such as cloud computing environment 300 in FIG. 3. Service container management system 500 is a system of hardware and software components for managing service container dependencies by breaking the dependence between linked service containers.

In this example, service container management system 500 includes service container dependency manager 502, web application service container B 504, and database service container A 506. Service container dependency manager 502 may be, for example, service container dependency manager 218 in FIG. 2. At 508, service container dependency manager 502 receives a service request from web application service container B 504. The service request received from web application service container B 504 is requesting the database service provided by database service container A 506. In other words, web application service container B 504 is a dependent service container that relies on a response from the service provided by database service container A 506 in order to perform its respective service.

Further, service container dependency manager 502 checks the service status of database service container A 506 at 510. If the service status indicates that database service container A 506 is running, then service container dependency manager 502 forwards the service request received from web application service container B 504 to database service container A 506 at 512. After receiving the service request, database service container A 506 processes the service request and sends a response to the service request directly to web application service container B 504 at 514. If the service status at 510 indicates that database service container A 506 is not running, then service container dependency manager 502 starts database service container A 506 at 516 and sends a response to the service request received from web application service container B 504 at 518 using stub data corresponding to database service container A 506. The stub data may be, for example, service container stub data 228 in FIG. 2.

Figure 6:
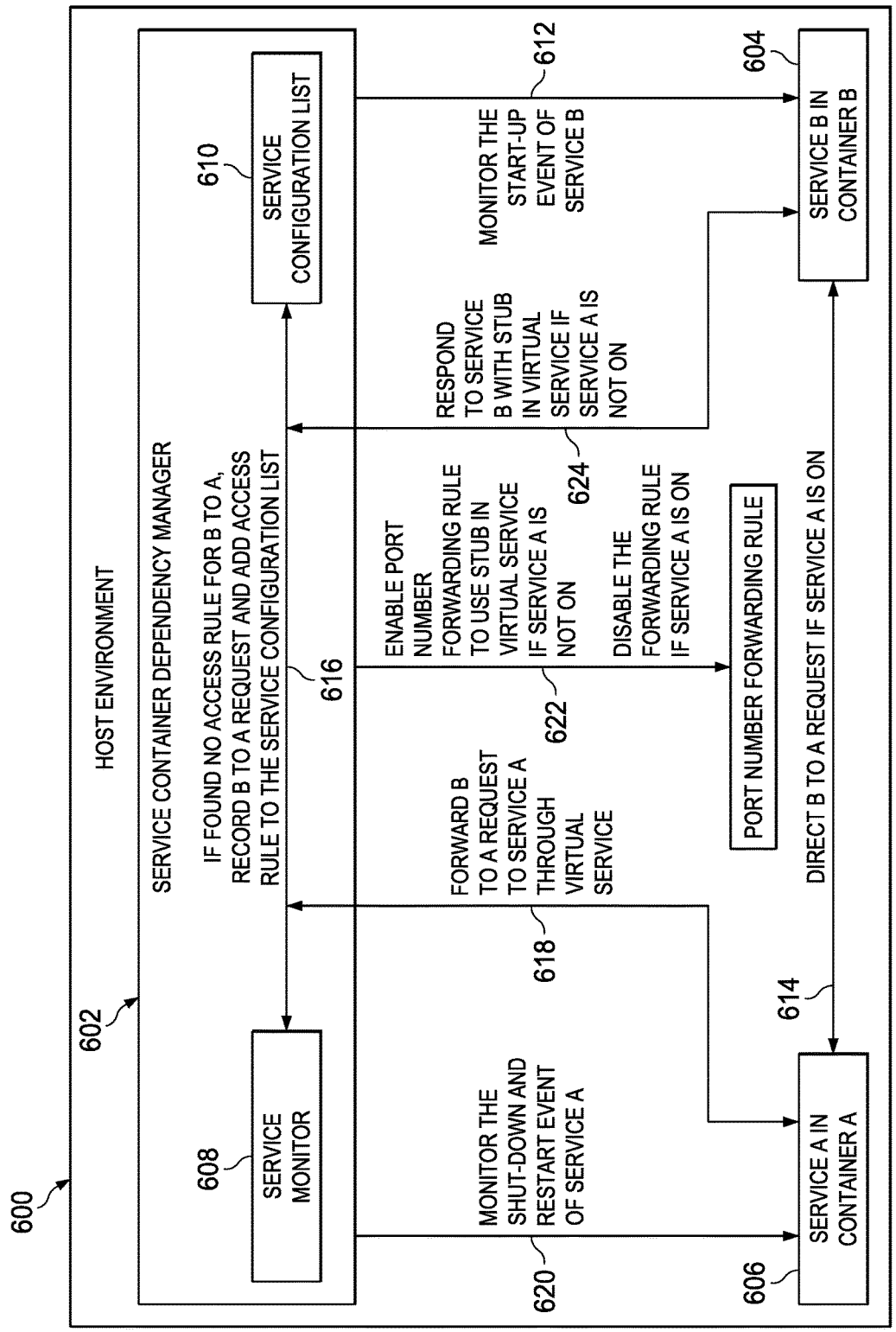
FIG. 6 is a diagram illustrating an example of a host environment in accordance with an illustrative embodiment.

With reference now to FIG. 6, a diagram illustrating an example of a host environment is depicted in accordance with an illustrative embodiment. Host environment 600 may be implemented in a network of data processing systems, such as network data processing system 100 in FIG. 1, or a cloud computing environment, such as cloud computing environment 300 in FIG. 3. In this example, host environment 600 includes service container dependency manager 602, service B in container B 604, and service A in container A 606. However, it should be noted that host environment 600 is only meant as an example and not as a limitation on illustrative embodiments. For example, host environment 600 may include more service containers than illustrated. In addition, service container dependency manager 602, service B in container B 604, and service A in container A 606 may be remotely distributed in a plurality of different host environments instead of being located within one host environment.

Service container dependency manager 602 may be, for example, service container dependency manager 502 in FIG. 5. Service B in container B 604 may be, for example, web application service container B 504 in FIG. 5. Service A in container A 606 may be, for example, database service container A 506 in FIG. 5.

In this example, service container dependency manager 602 includes service monitor 608 and service configuration list 610. Service monitor 608 and service configuration list 610 may be, for example, service monitor 220 and service configuration list 224 in FIG. 2. Service container dependency manager 602 utilizes service monitor 608 to monitor and record activity between service B in container B 604, and service A in container A 606. Service monitor 608 utilizes information in service configuration list 610 to know which service containers and corresponding port numbers to monitor within host environment 600.

In this example, service monitor 608 monitors a start up event corresponding to service B in container B 604 at 612. Service container dependency manager 602 allows direct sending of a service request from service B in container B 604 to service A in container A 606 at 614 if service A is up and running. Also, if no access rule exists in service configuration list 610 for service B in container B 604 to service A in container A 606, then service monitor 608 records the service request from service B to service A and add the access rule for service B to service A to service configuration list 610 at 616. In addition, service container dependency manager 602 forwards service requests from service B to service A at 618.

At 620, service monitor 608 monitors a shut down and restart event of service A in container A 606. At 622, service container dependency manager 602 enables a port number forwarding rule to utilize stub data in service configuration list 610 when service A is not running. The stub data may be, for example, service container stub data 228 in FIG. 2. At 624, service container dependency manager 602 responds to the service request from service B using the stub data running on service container dependency manager 602 when service A is shut down or restarting.

Figure 7:
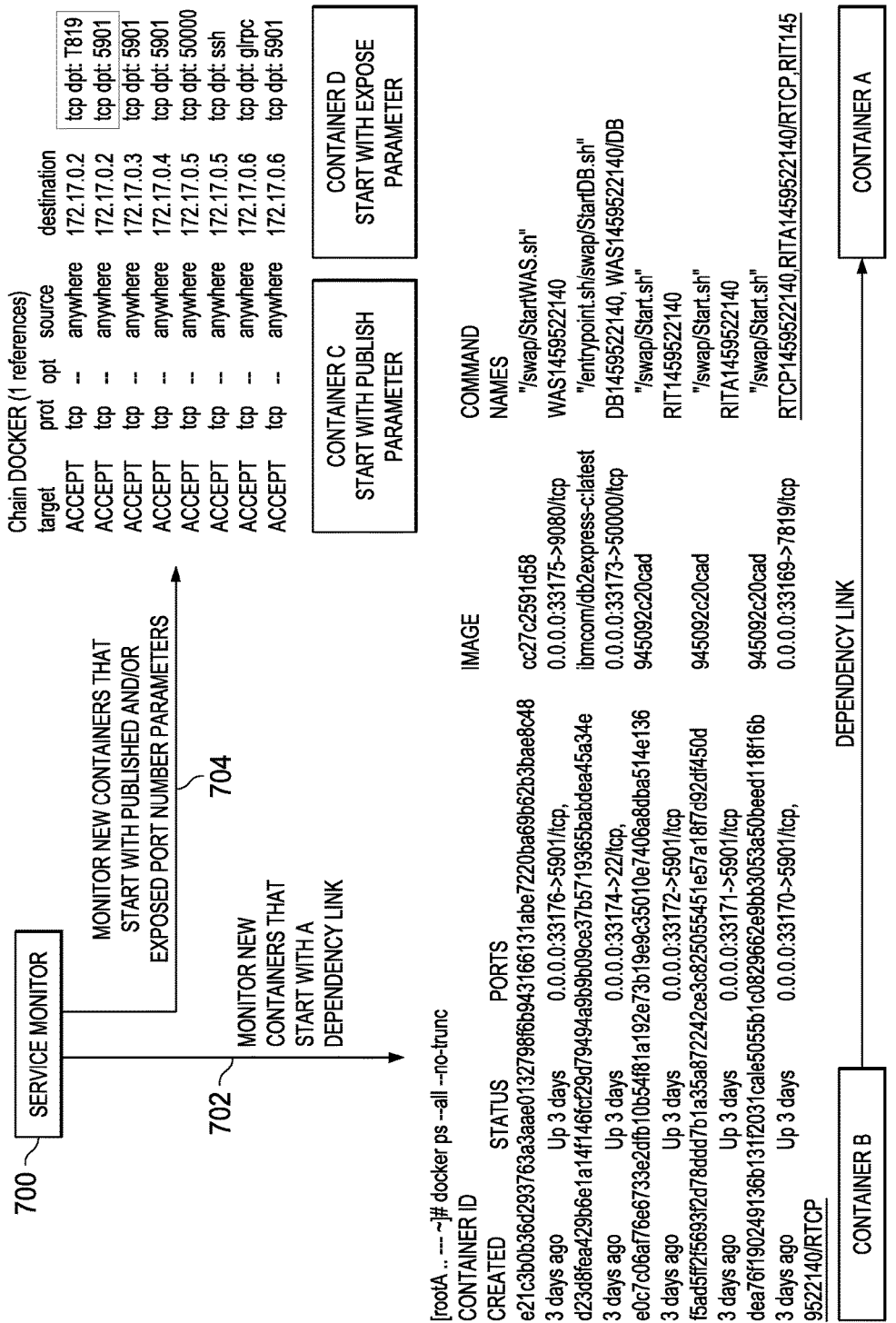
FIG. 7 is a diagram illustrating an example of a service monitor in accordance with an illustrative embodiment.

With reference now to FIG. 7, a diagram illustrating an example of a service monitor is depicted in accordance with an illustrative embodiment. Service monitor 700 may be located in a host cloud environment, such as cloud computing environment 300 in FIG. 3. In addition, service monitor 700 may be implemented in a service container dependency manager, such as service container dependency manager 602 in FIG. 6. For example, service monitor 700 may be service monitor 608 in FIG. 6.

In this example, at 702 service monitor 700 monitors new service containers that start with a dependency link between service containers, such as the dependency link between service B in container B 604 and service A in container A 606 in FIG. 6. In addition, at 704 service monitor 700 monitors new service containers that start with published and/or exposed port number parameters. For example, service monitor 700 monitors all inbound service requests between service containers based on the following rules: 1) if two service containers with "--name" and "--link" parameters are started on the host environment, then service monitor 700 monitors the current status (e.g., running or not running) of the service containers having the dependency link between the service containers and monitors all exposed port numbers of the service containers; 2) if a service container with an "--expose" parameter to expose its corresponding port number is started on the host environment, then service monitor 700 queries a service configuration list to determine which port number is exposed and needs to be monitored for the service container; and 3) if a service container with a "--publish" or "--publish-all" parameter to publish its corresponding port numbers is started on the host environment, then, as with exposed port numbers, service monitor 700 can use the service configuration list to query the published port numbers of the service container.

Figure 8B:
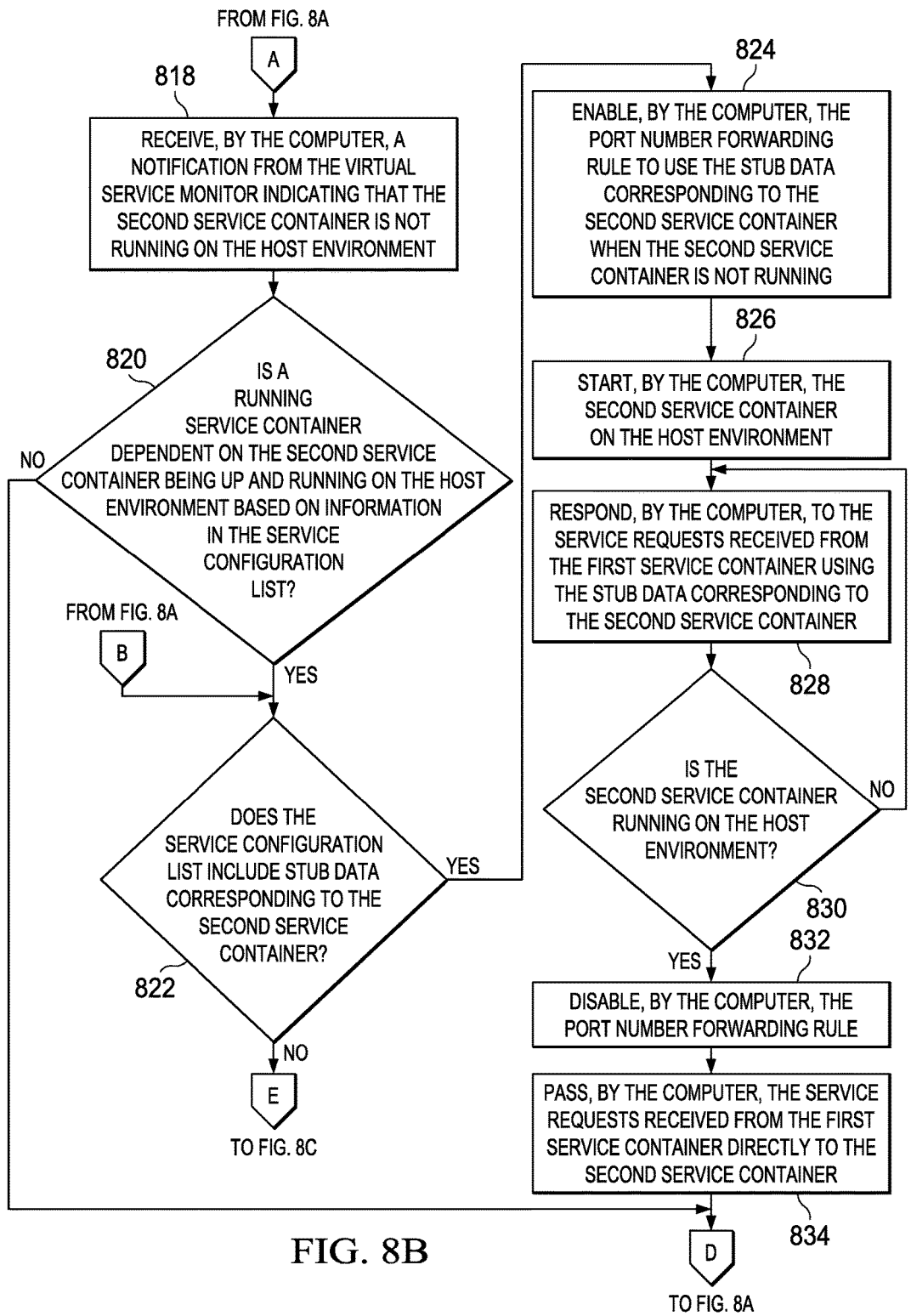
Figure 8C:
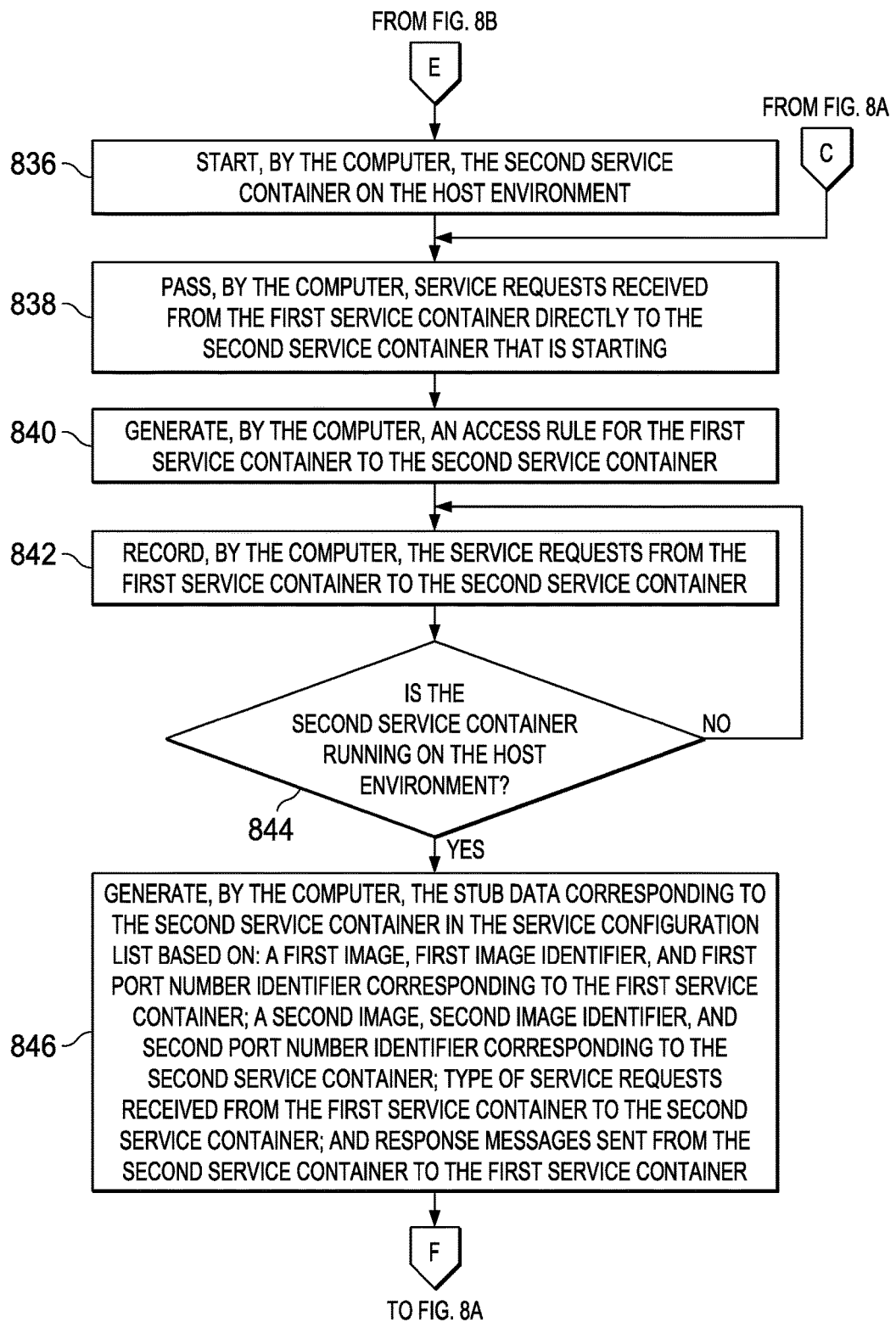

With reference now to FIGS. 8A-8C, a flowchart illustrating a process for managing service container dependency is shown in accordance with an illustrative embodiment. The process shown in FIGS. 8A-8C may be implemented in a computer, such as, for example, server 104 FIG. 1, data processing system 200 in FIG. 2, or a cloud computing node in cloud computing nodes 310 in FIG. 3.

The process begins when the computer starts a virtual service monitor on a host environment (step 802). The virtual service monitor may be, for example, service monitor 608 in FIG. 6. The host environment may be, for example, host environment 600 in FIG. 6.

The computer monitors service containers and their respective dependent service containers that are included in a service configuration list corresponding to the host environment using the virtual service monitor (step 804). The service configuration list may be, for example, service configuration list 610 in FIG. 6. Subsequently, the computer receives a notification from the virtual service monitor indicating that a first service container is running on the host environment (step 806). The first service container may be, for example, web application service container B 504 in FIG. 5.

Afterward, the computer makes a determination as to whether the first service container is dependent on a second service container being up and running on the host environment (step 808). If the computer determines that the first service container is not dependent on a second service container being up and running on the host environment, no output of step 808, then the process returns to step 804 where the computer continues to monitor the service containers. If the computer determines that the first service container is dependent on a second service container being up and running on the host environment, yes output of step 808, then the computer makes a determination as to whether the second service container is running on the host environment (step 810). The second service container may be, for example, database service container A 506 in FIG. 5.

If the computer determines that the second service container is not running on the host environment, no output of step 810, then the process proceeds to step 822. If the computer determines that the second service container is running on the host environment, yes output of step 810, then the computer makes a determination as to whether the service configuration list includes stub data corresponding to the second service container (step 812). The stub data corresponding to the second service container may be, for example, service container stub data 228 in FIG. 2.

If the computer determines that the service configuration list does not include stub data corresponding to the second service container, no output of step 812, then the process proceeds to step 838. If the computer determines that the service configuration list does include stub data corresponding to the second service container, yes output of step 812, then the computer disables a port number forwarding rule that uses the stub data corresponding to the second service container when the second service container is not running (step 814). The port number forwarding rule may be, for example, port number forwarding rule 230 in FIG. 2. In addition, the computer passes service requests received from the first service container directly to the second service container (step 816). Thereafter, the process returns to step 804 where the computer continues to monitor the service containers using the virtual service monitor.

The computer receives a notification from the virtual service monitor indicating that the second service container is not running on the host environment (step 818). Afterward, the computer makes a determination as to whether a running service container is dependent on the second service container being up and running on the host environment based on information in the service configuration list (step 820). If the computer determines that no running service container depends on the second service container being up and running on the host environment based on the information in the service configuration list, no output of step 820, then the process returns to step 804 where the computer continues to monitor the service containers using the virtual service monitor. If the computer determines that a running service container is dependent on the second service container being up and running on the host environment based on the information in the service configuration list, yes output of step 820, then the computer makes a determination as to whether the service configuration list includes stub data corresponding to the second service container (step 822).

If the computer determines that the service configuration list does not include stub data corresponding to the second service container, no output of step 822, then the process proceeds to step 836. If the computer determines that the service configuration list does include stub data corresponding to the second service container, yes output of step 822, then the computer enables the port number forwarding rule to use the stub data corresponding to the second service container when the second service container is not running (step 824). Further, the computer starts the second service container on the host environment (step 826).

Furthermore, the computer responds to the service requests received from the first service container using the stub data corresponding to the second service container (step 828). Moreover, the computer makes a determination as to whether the second service container is running on the host environment (step 830). If the computer determines that the second service container is not running on the host environment, no output of step 830, then the process returns to step 828 where the computer continues to respond to the service requests received from the first service container using the stub data corresponding to the second service container. If the computer determines that the second service container is running on the host environment, yes output of step 830, then the computer disables the port number forwarding rule (step 832). In addition, the computer passes the service requests received from the first service container directly to the second service container (step 834). Thereafter, the process returns to step 804 where the computer continues to monitor the service containers using the virtual service monitor.

The computer starts the second service container on the host environment (step 836) in response to the computer determining that the service configuration list does not include stub data corresponding to the second service container. The computer also passes service requests received from the first service container directly to the second service container that is starting (step 838). In addition, the computer generates an access rule for the first service container to the second service container (step 840). The access rule may be, for example, access rule 232 in FIG. 2.

Further, the computer records the service requests from the first service container to the second service container (step 842). Furthermore, the computer makes a determination as to whether the second service container is running on the host environment (step 844). If the computer determines that the second service container is not running on the host environment, no output of step 844, then the process returns to step 842 where the computer continues to record the service requests from the first service container to the second service container. If the computer determines that the second service container is running on the host environment, yes output of step 844, then the computer generates the stub data corresponding to the second service container in the service configuration list based on: a first image, first image identifier, and first port number identifier corresponding to the first service container; a second image, second image identifier, and second port number identifier corresponding to the second service container; type of service requests received from the first service container to the second service container; and response messages sent from the second service container to the first service container (step 846). Thereafter, the process returns to step 804 where the computer continues to monitor the service containers using the virtual service monitor.

Thus, illustrative embodiments of the present invention provide a computer-implemented method, computer system, and computer program product for breaking dependence between service containers in a host environment using stub data running on a service container dependency manager of the host environment. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer-implemented method for managing service container dependency, the computer-implemented method comprising:
   receiving, by a computer, a notification that a first service container is running on a host environment;
   determining, by the computer, whether the first service container is dependent on a second service container being up and running on the host environment;
   responsive to the computer determining that the first service container is dependent on a second service container being up and running on the host environment, determining, by the computer, whether the second service container is running on the host environment;
   responsive to the computer determining that the second service container is not running on the host environment, responding, by the computer, to service requests from the first service container to the second service container using stub data running on the computer that corresponds to the second service container; and
   responsive to the computer determining that the second service container is running on the host environment, generating, by the computer, the stub data corresponding to the second service container based on an image, an image identifier, and a port number identifier corresponding to the second service container, the service requests received from the first service container to the second service container, and responses to the service requests sent from the second service container to the first service container.

2. The computer-implemented method of claim 1 further comprising:
   responsive to the computer determining that the second service container is running on the host environment, determining, by the computer, whether a service configuration list includes the stub data corresponding to the second service container;
   responsive to the computer determining that the service configuration list does include the stub data corresponding to the second service container, disabling, by the computer, a port number forwarding rule that uses the stub data corresponding to the second service container when the second service container is not running on the host environment; and
   passing, by the computer, the service requests from the first service container directly to the second service container.

3. The computer-implemented method of claim 1 further comprising:
   monitoring, by the computer, service containers and their respective dependent service containers listed in a service configuration list corresponding to the host environment using a service monitor.

4. The computer-implemented method of claim 1 further comprising:
   receiving, by the computer, a notification indicating that the second service container is not running on the host environment; and
   responsive to receiving the notification indicating that the second service container is not running on the host environment, determining, by the computer, whether a running service container is dependent on the second service container being up and running on the host environment based on information in a service configuration list.

5. The computer-implemented method of claim 4 further comprising:
   responsive to the computer determining that a running service container is dependent on the second service container being up and running on the host environment based on the information in the service configuration list, determining, by the computer, whether the service configuration list includes the stub data corresponding to the second service container;
   responsive the computer determining that the service configuration list does include the stub data corresponding to the second service container, enabling, by the computer, a port number forwarding rule to use the stub data corresponding to the second service container when the second service container is not running; and
   starting, by the computer, the second service container on the host environment.

6. The computer-implemented method of claim 1 further comprising:
   generating, by the computer, an access rule for the first service container to the second service container, wherein the access rule directs a service container dependency manager to allow direct access between the first service container and the second service container that the first service container depends upon when the first service container is running and ready to process a service request from the second service container.

7. The computer-implemented method of claim 1 further comprising:
recording, by the computer, the service requests from the first service container to the second service container; and
recording, by the computer, responses to the service requests.

8. The computer-implemented method of claim 1, wherein the host environment is a cloud environment, and wherein the cloud environment includes the computer, the first service container, and the second service container.

9. The computer-implemented method of claim 1, wherein the computer utilizes the stub data to take over and execute a service of the second service container in response to the second service container not being available to process the service requests from the first service container which depends on the service of the second service container.

10. A computer system for managing service container dependency, the computer system comprising:
a bus system;
a storage device connected to the bus system, wherein the storage device stores program instructions; and
a processor connected to the bus system, wherein the processor executes the program instructions to:
receive a notification that a first service container is running on a host environment;
determine whether the first service container is dependent on a second service container being up and running on the host environment;
determine whether the second service container is running on the host environment in response to determining that the first service container is dependent on the second service container being up and running on the host environment;
respond to service requests from the first service container to the second service container using stub data running on the computer system that corresponds to the second service container in response to determining that the second service container is not running on the host environment; and
generate the stub data corresponding to the second service container based on an image, an image identifier, and a port number identifier corresponding to the second service container, the service requests received from the first service container to the second service container, and responses to the service requests sent from the second service container to the first service container in response to determining that the second service container is running on the host environment.

11. The computer system of claim 10, wherein the processor further executes the program instructions to:
determine whether a service configuration list includes the stub data corresponding to the second service container in response to determining that the second service container is running on the host environment;
disable a port number forwarding rule that uses the stub data corresponding to the second service container when the second service container is not running on the host environment in response to determining that the service configuration list does include the stub data corresponding to the second service container; and
pass the service requests from the first service container directly to the second service container.

12. A computer program product for managing service container dependency, the computer program product comprising a computer readable storage medium having program instructions embodied therewith, the program instructions executable by a computer to cause the computer to perform a method comprising:
receiving, by the computer, a notification that a first service container is running on a host environment;
determining, by the computer, whether the first service container is dependent on a second service container being up and running on the host environment;
responsive to the computer determining that the first service container is dependent on a second service container being up and running on the host environment, determining, by the computer, whether the second service container is running on the host environment;
responsive to the computer determining that the second service container is not running on the host environment, responding, by the computer, to service requests from the first service container to the second service container using stub data running on the computer that corresponds to the second service container; and
responsive to the computer determining that the second service container is running on the host environment, generating, by the computer, the stub data corresponding to the second service container based on an image, an image identifier, and a port number identifier corresponding to the second service container, the service requests received from the first service container to the second service container, and responses to the service requests sent from the second service container to the first service container.

13. The computer program product of claim 12 further comprising:
responsive to the computer determining that the second service container is running on the host environment, determining, by the computer, whether a service configuration list includes the stub data corresponding to the second service container;
responsive to the computer determining that the service configuration list does include the stub data corresponding to the second service container, disabling, by the computer, a port number forwarding rule that uses the stub data corresponding to the second service container when the second service container is not running on the host environment; and
passing, by the computer, the service requests from the first service container directly to the second service container.

14. The computer program product of claim 12 further comprising:
monitoring, by the computer, service containers and their respective dependent service containers listed in a service configuration list corresponding to the host environment using a service monitor.

15. The computer program product of claim 12 further comprising:
receiving, by the computer, a notification indicating that the second service container is not running on the host environment; and
responsive to receiving the notification indicating that the second service container is not running on the host environment, determining, by the computer, whether a running service container is dependent on the second service container being up and running on the host environment based on information in a service configuration list.

16. The computer program product of claim 15 further comprising:
    responsive to the computer determining that a running service container is dependent on the second service container being up and running on the host environment based on the information in the service configuration list, determining, by the computer, whether the service configuration list includes the stub data corresponding to the second service container;
    responsive the computer determining that the service configuration list does include the stub data corresponding to the second service container, enabling, by the computer, a port number forwarding rule to use the stub data corresponding to the second service container when the second service container is not running; and
    starting, by the computer, the second service container on the host environment.

17. The computer program product of claim 12 further comprising:
    generating, by the computer, an access rule for the first service container to the second service container, wherein the access rule directs a service container dependency manager to allow direct access between the first service container and the second service container that the first service container depends upon when the first service container is running and ready to process a service request from the second service container.

18. The computer program product of claim 12 further comprising:
    recording, by the computer, the service requests from the first service container to the second service container; and
    recording, by the computer, responses to the service requests.

* * * * *